May 30, 1950 — G. L. STEVENS — 2,509,581
GROOVING TOOL
Filed July 9, 1947
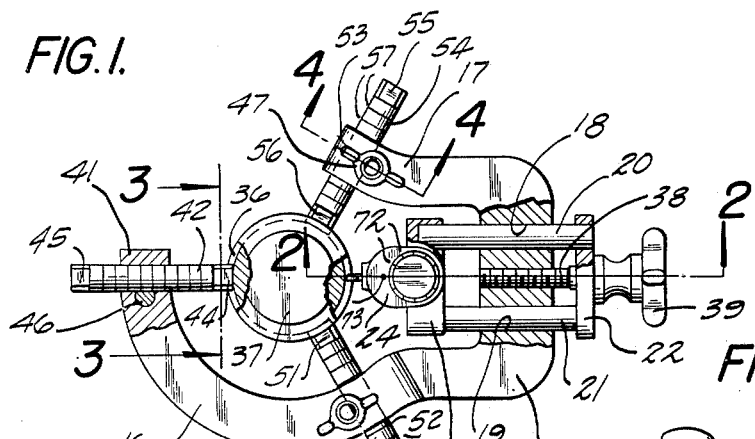
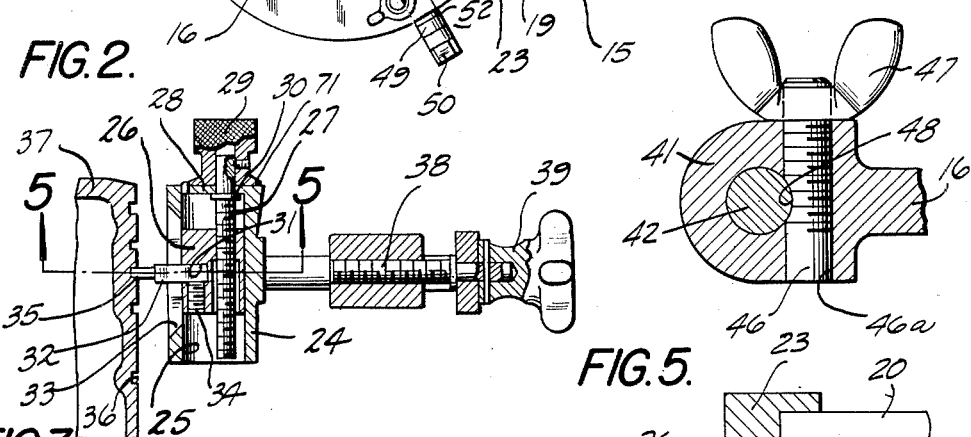
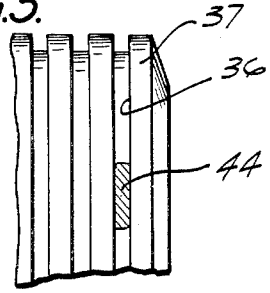
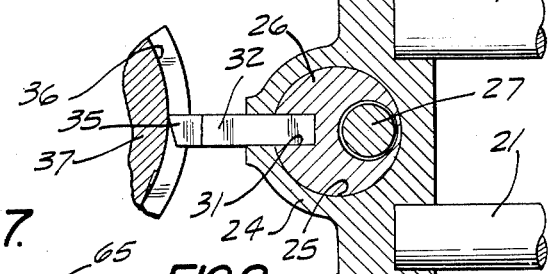
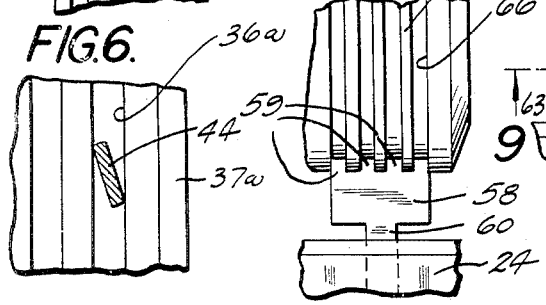
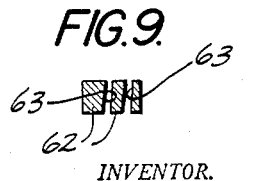
INVENTOR.
GUY L. STEVENS.
BY Thos. L. Donnelly
ATTORNEY.

Patented May 30, 1950

2,509,581

UNITED STATES PATENT OFFICE 2,509,581

GROOVING TOOL

Guy L. Stevens, Detroit, Mich.

Application July 9, 1947, Serial No. 759,826

2 Claims. (Cl. 82—4)

My invention relates to a new and useful improvement in a grooving tool adapted primarily for cleaning out the grooves of the piston used on internal combustion engines or other engines, the grooves being the grooves which are commonly occupied by the piston rings.

It is an object of the present invention to provide a tool of this class which will be simple in structure, economical of manufacture, durable, compact, light, easily and quickly operated and highly efficient in use.

Another object of the invention is the provision of a tool of this class which will efficiently clean out all foreign material from the grooves of a piston.

Another object of the invention is the provision in a tool of this class of means for cleaning the ring grooves of a piston and, at the same time, straightening the ribs or dividing portions of metal which separate the grooves.

Another object of the invention is the provision in a tool of this class of a tool carrying member which may be adjustable to various positions relatively to the tool itself.

Another object of the invention is the provision in a tool of this class of a plurality of guiding members adapted for riding in the ring grooves of a piston and guiding the tool in its operation.

Another object of the invention is the provision of a plurality of guide members used on a tool of this class and engageable in the ring grooves of a piston and so arranged and constructed that they may be moved to various positions for accommodating grooves of different widths.

Another object of the invention is the provision in a tool of this class of means for accurately centering the tool relatively to a piston on which used and retaining the device centered while the operation is being performed.

Another object of the invention is the provision in a device of this class of a tool carrying member which may be movable toward and away from the piston so as to regulate the depth of insert of the cleaning tool.

Other objects will appear hereinafter.

It is recognized that various modifications and changes may be made in the detail of structure illustrated without departing from the invention itself and it is intended that such shall be embraced within the scope of the claims which form a part hereof.

Forming a part of this specification are drawings in which,

Fig. 1 is a plan view of the invention showing it applied with parts broken away and parts shown in section, Fig. 2 is a fragmentary, sectional view slightly enlarged taken on line 2—2 of Fig. 1, Fig. 3 is a sectional view taken on line 3—3 of Fig. 1 slightly enlarged, Fig. 4 is an enlarged fragmentary, sectional view taken on line 4—4 of Fig. 1, Fig. 5 is an enlarged fragmentary, sectional view taken on line 5—5 of Fig. 2, Fig. 6 is an enlarged view similar to Fig. 3, showing a different type of piston, Fig. 7 is a fragmentary, side elevational view of a piston showing a different type of tool, Fig. 8 is a side elevational view in fragment of another type of tool, Fig. 9 is a sectional view taken on line 9—9 of Fig. 8.

As shown in the drawings, the invention comprises a frame embodying a head 15 and a pair of arms 16 and 17, the arms 16 and 17 being curved, as clearly shown in Fig. 1. Slidably projected through passages or openings 18 and 19, formed through the head 15, are rods 20 and 21 which are connected together at one of their ends by the cross head 22 and at their opposite ends by the connecting bar 23 which serves to support and which is formed preferably integral with a slide barrel 24 having the bore 25 formed therein in which is slidably mounted the carriage 26. Threaded through a threaded opening formed in this carriage 26 is the threaded screw 27 which projects through the end wall 28 of the barrel 24 and which is provided on its outer end with the knob 29 which is fastened thereto in fixed relation. Fixedly mounted on this screw 27 within the barrel so as to bear against the inner face of the end wall 28 is a washer 30. The construction is such that upon a rotating of the screw 27, the screw 27 will remain in fixed, axial relation to the barrel 24 and the slide or carriage 26 will be caused to travel length-wise of the barrel 24.

A recess 31 is formed in the slide 26 for reception of a tool 32 having the operating end 35 formed thereon. This tool 32 projects through an elongated slot 33 formed in the barrel 24. The tool 32 is retained in position by the set screw 34. The construction is such that upon rotating the screw 27, the tool 32 may be caused to travel longitudinally of the barrel 24. The working end 35 of the tool is adapted to engage in the ring groove 36 formed in the piston 37. Threaded through a threaded opening formed in the head 15 is a screw 38 which projects through the cross bar 32. Fixedly mounted on the projecting end of this screw 38 is a knob 39 whereby the screw may be rotated. This knob 39 engages one face of the cross head 22 and the other face is engaged by a washer 24 fixedly mounted on the screw 38 so that upon a rotating of the screw 38, the cross head 22 and its connecting parts are caused to travel so as to move the rods 21 and 20 longitudinally. In this manner, the tool carried by the slide 26 may be moved inwardly or outwardly of the piston 37.

Formed in the end of the curved arm 16 is a knuckle 41 having a passage formed therethrough which is in alignment with the center of the cross head 15. Projected through this knuckle is a guide finger 42 having graduations 43 formed on its periphery. Each end of the finger 42 is formed flat, as at 44 and 45, these ends being of different thicknesses so that by reversing the finger 42, the flat end may be used on a groove of a different width. In this construction, there is shown three of these guide fingers, guide fingers 49 and 54 being shown in contour with the guide finger 42. Each of these guide fingers is secured in a knuckle in a similar manner so that the description of one will suffice for all. Projected through a passage 46a, formed in the knuckle 41, is a threaded stud 46 having a recess 48 formed in its periphery and provided with a wing nut 47. The construction is such that by threading the wing nut 47 onto the stud 46, the guide finger 42 will be bound or clamped in fixed relation to the knuckle 41. The guide finger 49 is projected through a knuckle formed in the arm 16 and is also provided at its opposite ends with the flat end portions 50 and 51 which are of different thickness. Projected through a passage formed in a knuckle 53 on the arm 17 is a guide finger 54 having the opposite flattened ends 55 and 56 and provided with the graduations 57. The guide finger 49 is also provided with the graduations 52. These graduations are such that an operator, by adjusting the guide finger longitudinally to the proper graduation indicated, will be able to adjust the device accurately to a definite size of piston ring or piston groove in which the guide finger is to engage.

In use, the piston 37 may be mounted on a rotatable arbor or other suitable support. The frame is then positioned about the piston in the manner shown in Fig. 1 and the guide fingers are moved inwardly the proper distance so that the ends thereof engage in a groove formed in the piston. These guide fingers are then secured fixed to the supporting frame and serve as a guide means in the relative rotation of the frame and the piston. A working tool is then moved to engage in the groove and by rotating the screw 38, the proper depth of insert may be obtained. A relative rotation is then effected between the piston and the frame so as to clean out the ring groove and properly face the sides and bottom thereof. This relative rotation may be effected by manually rotating the frame around the stationary pistons or it may be effected by rotating the piston while the frame is held in stationary position. When the frame is once mounted on a piston, the working tool may be moved to different grooves without necessitating removing the frame from the piston or remounting it. This is accomplished by withdrawing the tool from the groove which has been operated upon and then, through a rotation of the screw 27, moving the working tool longitudinally of the barrel 24 to the proper distance. The knob 29 is provided with the flange 71 on which are formed graduations 72. An indicating point 73 is formed on the end wall of the bell 24 so that the operator, by watching the graduation and the indicating point 73, will, upon rotating the screw 27, be able to determine exactly the distance longitudinally that the cutting tool or operating tool has been moved. Consequently, this renders it possible for the operator to more accurately space the grooves in the event that they have been worn excessively on one side or the other. By operating on the grooves of a piston in this manner, it becomes possible to easily and quickly clean them from all foreign material, rust, dirt, grease, etc., and properly face them.

In Fig. 6, I have shown a method of using the guide fingers when the groove 36a on the piston 37a is of greater width than the guide fingers themselves. The guide fingers may then be rotated so that the flattened portion of the guide finger engages the opposite sides of the grooves and, thus a proper guiding of the frame and the piston, during relative rotation, becomes possible.

In Fig. 7, I have indicated a tool embodying a head 58, a plurality of tongues 59, and a shank 60 which is adapted to be mounted on the slide carried by the barrel 24. With this type of construction, a number of grooves may be operated upon at the same time, and the ribs 65, which separates the groove 66, may also be operated upon. This makes it possible to properly re-face these ribs 67 and, in the event they have been bent or distorted, bring them back to their original form.

In Fig. 8, I have indicated a tool embodying the head 61, a plurality of tongues 62 separated by the space 63 and having a shank 64 which is adapted for connection to the carriage in the barrel 24.

It will be noted from Fig. 9 that the face 63 is inclined, this inclining being angular to the axis of the piston upon which the operation is performed. One type of automobile uses a piston having the ribs at an incline to the axis of the piston and this particular tool is adapted for accommodation to this type of piston. Moreover, the ribs separating the piston grooves in which the fingers 62 engage are very narrow and frequently become bent out of shape. By operating upon the piston in the manner described, the grooves are cleaned out and the separating ribs are restored to their original form and shape. In the use of pistons, this bending of the separating ribs is generally axially of the piston, due to many causes, and in most instances, when the separating rib becomes bent out of shape and it becomes necessary to place a ring in the groove, the piston will not accommodate the ring with the result that the piston is discarded. With the present invention, and using the tools described, a discarding of the piston is no longer necessary as the piston may be restored to substantially its former condition when new.

Experience has shown that a tool of this class is highly efficient in use and results in considerable saving in labor in cleaning a piston and frequently results in saving pistons which would otherwise be discarded. Another feature of the tool is that the grooves may be faced on the side walls and at the bottom so that should there be any variation in the piston ring itself, this variation can be compensated for by properly facing the groove, either at the side walls or at its bottom and this facing becomes possible through the adjustable features of the tools which have been described.

What I claim as new is:

1. A tool of the class described adapted for cleaning and re-shaping the ring grooves of a piston, comprising: a substantially C shaped frame an offset portion intermediate the ends of said frame forming an open end cavity having at least one flat wall; a plurality of spaced supporting arms carried by the frame; guide fingers carried by said arms and engaging at one of their ends in the grooves of a piston to be operated upon; a pair of rods slidably projected through said flat wall; means for connecting the outer ends of said rods together; a cross-head for connecting the inner ends of said rods together; a barrel carried by said cross-head disposed in said cavity; a carriage slidably mounted in said barrel, said barrel having a longitudinally directed slot formed on one side; screw means for moving said carriage longitudinally of said barrel axially of the piston operated upon; a work tool connected to said carriage and projecting outwardly through said slot and engaging in the groove of the piston to be operated upon.

2. A tool of the class described adapted for cleaning and re-shaping the ring grooves of a piston, comprising: a substantially C shaped frame an offset portion intermediate the ends of said frame forming an open end cavity having at least one flat wall; a plurality of spaced supporting arms carried by the frame; guide fingers carried by said arms and engaging at one of their ends in the grooves of a piston to be operated upon; a pair of rods slidably projected through said flat wall; means for connecting the outer ends of said rods together; a cross-head for connecting the inner ends of said rods together; a barrel carried by said cross-head and disposed in said cavity; a carriage slidably mounted in said barrel, said barrel having a longitudinally directed slot formed on one side; screw means for moving said carriage longitudinally of said barrel axially of the piston operated upon; a work tool connected to said carriage and projecting outwardly through said slot and engaging in the groove of the piston to be operated upon; and threaded means carried by said flat wall and adapted upon rotation for moving said cross-head inwardly and outwardly with relation to the piston to be operated upon.

GUY L. STEVENS.

REFERENCES CITED

The following references are of record in the file of this patent:

UNITED STATES PATENTS

| Number | Name | Date |
| --- | --- | --- |
| 1,028,805 | Wood | June 4, 1912 |
| 1,515,636 | Wagner | Nov. 18, 1924 |
| 1,715,289 | Hellman | May 28, 1929 |
| 1,768,692 | Kaplan | July 1, 1930 |
| 1,820,792 | Funchess | Aug. 25, 1931 |
| 2,194,686 | Berggren | Mar. 26, 1940 |